(12) United States Patent
Mondora et al.

(10) Patent No.: US 11,110,967 B2
(45) Date of Patent: Sep. 7, 2021

(54) VEHICLE BODY PANEL REINFORCEMENT

(71) Applicants: Raymond Bradley Mondora, Bloomfield Hills, MI (US); Neil R Kauppila, Waterford, MI (US); Jordan MacIntire, Detroit, MI (US)

(72) Inventors: Raymond Bradley Mondora, Bloomfield Hills, MI (US); Neil R Kauppila, Waterford, MI (US); Jordan MacIntire, Detroit, MI (US)

(73) Assignee: FCA US LLC, Auburn Hills, MI (US)

( * ) Notice: Subject to any disclaimer, the term of this patent is extended or adjusted under 35 U.S.C. 154(b) by 176 days.

(21) Appl. No.: 16/574,922

(22) Filed: Sep. 18, 2019

(65) Prior Publication Data

US 2021/0078640 A1    Mar. 18, 2021

(51) Int. Cl.
*B60J 7/00* (2006.01)
*B62D 25/12* (2006.01)
*B60J 5/04* (2006.01)
*B60R 21/231* (2011.01)

(52) U.S. Cl.
CPC .............. *B62D 25/12* (2013.01); *B60J 5/043* (2013.01); *B32B 2305/08* (2013.01); *B32B 2605/00* (2013.01); *B60J 5/0469* (2013.01); *B60R 21/231* (2013.01)

(58) Field of Classification Search
CPC .... B60N 2/2821; B60N 2/2863; B60N 2/286; B60R 22/18; B60R 22/26; H01L 2224/45015; H01L 2924/00014; H01L 2924/00; A63H 3/20; A61B 17/1214
See application file for complete search history.

(56) References Cited

U.S. PATENT DOCUMENTS

| | | | |
|---|---|---|---|
| 1,550,478 A * | 8/1925 | Wiggins ................ | B60G 11/113 267/52 |
| 2,014,482 A * | 9/1935 | Pedranti ................ | B60G 11/113 267/52 |
| 2,040,271 A * | 5/1936 | Rosenzweig .......... | A45C 13/06 150/118 |
| 2,074,843 A * | 3/1937 | Hiering .................. | A45C 13/06 150/118 |
| 2,163,759 A * | 6/1939 | McCann .................. | A47C 7/64 297/188.2 |
| 2,678,819 A * | 5/1954 | Douglass .............. | B60G 11/113 267/52 |
| 2,693,354 A * | 11/1954 | Walter .................... | B60G 11/04 267/262 |
| 3,730,508 A * | 5/1973 | Marian ...................... | F16F 1/26 267/52 |
| 3,850,445 A * | 11/1974 | Borns .................. | B60G 21/055 280/124.163 |
| 3,913,937 A * | 10/1975 | Longworth .............. | B60G 7/04 280/680 |

(Continued)

*Primary Examiner* — Kiran B Patel

(74) *Attorney, Agent, or Firm* — Ralph E. Smith

(57) ABSTRACT

A vehicle structure includes a body panel, a first spring anchor, a second spring anchor; and an elongated spring having a first end disposed at a first spring anchor and a second end disposed at a second spring anchor. The spring is preloaded when assembled to form an apex between the first end and the second end. The apex is disposed adjacent to the body panel to provide an outward force on the body panel.

20 Claims, 13 Drawing Sheets

(56) References Cited

U.S. PATENT DOCUMENTS

| | | | | |
|---|---|---|---|---|
| 4,069,994 | A * | 1/1978 | Wharmby | B65B 67/125 248/101 |
| 4,141,428 | A * | 2/1979 | Loeb | B60G 11/113 180/349 |
| 4,946,190 | A * | 8/1990 | Buttner | B60G 11/465 280/124.163 |
| 4,966,387 | A * | 10/1990 | White, IV | B60G 11/465 267/241 |
| 5,002,245 | A * | 3/1991 | Hansen | B65B 67/125 248/101 |
| 5,938,221 | A * | 8/1999 | Wilson | F16F 1/368 280/124.163 |
| 6,508,587 | B1 * | 1/2003 | Byers, Jr. | B65D 33/30 383/33 |
| 6,641,187 | B2 * | 11/2003 | Hsu | B65B 51/043 248/99 |
| 6,904,647 | B2 * | 6/2005 | Byers, Jr. | A45C 13/10 24/30.5 R |
| 7,578,547 | B1 | 8/2009 | Mackay et al. | |
| 8,678,650 | B2 * | 3/2014 | Savage | B65D 33/30 383/33 |
| 9,102,423 | B2 * | 8/2015 | Verma | B65B 7/00 |
| 9,499,291 | B2 * | 11/2016 | Verma | B65D 33/007 |
| 9,663,271 | B2 * | 5/2017 | Verma | B65D 33/02 |
| 9,682,809 | B2 * | 6/2017 | Hartley | B65D 33/007 |
| 10,494,146 | B2 * | 12/2019 | Verma | B65D 33/00 |
| 10,549,594 | B2 * | 2/2020 | Chihara | B21D 53/886 |
| 10,597,197 | B2 * | 3/2020 | Verma | B65D 33/007 |
| 2002/0096249 | A1 * | 7/2002 | Meatto | F16F 1/368 156/245 |
| 2003/0230865 | A1 * | 12/2003 | Warinner | B60G 21/073 280/124.162 |
| 2019/0113095 | A1 * | 4/2019 | Wolf-Monheim | B32B 5/26 |

\* cited by examiner

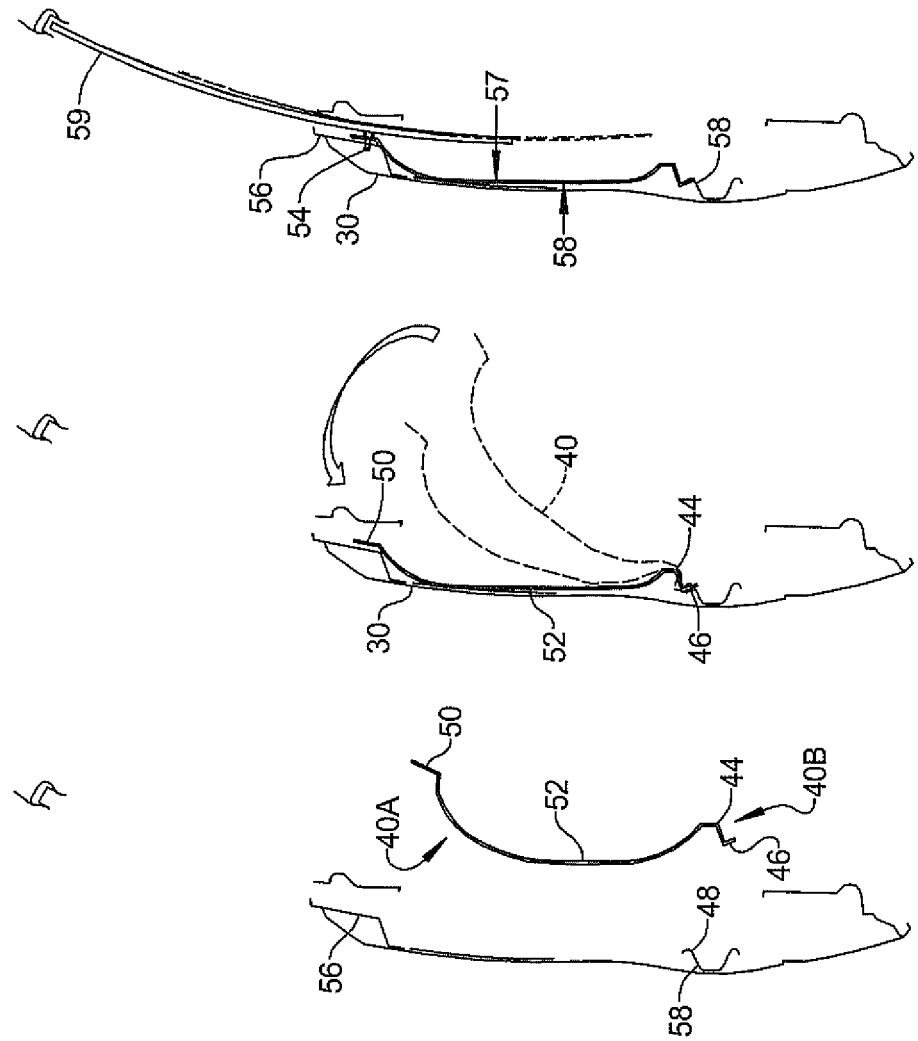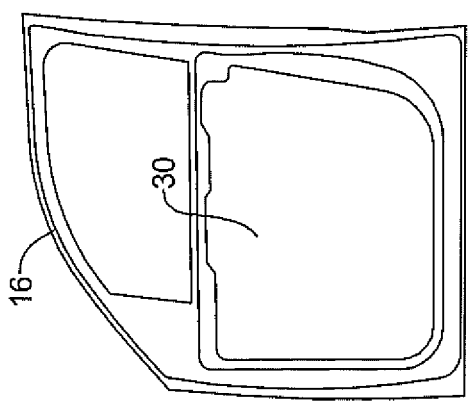

VEHICLE BODY PANEL REINFORCEMENT

TECHNICAL FIELD

The present disclosure relates generally to a vehicle body panel and, more specifically, to a method and system for reinforcing a vehicle body panel.

BACKGROUND

The statements in this section merely provide background information related to the present disclosure and does not constitute prior art.

Vehicles include outer panels that are used to form the outer shape of the vehicle. Panels such as fenders, doors and quarter panels are all part of the styling of the vehicle and part of the rigid structure of the vehicle. Over the years, styling has become more aggressive. Body panels typically have very many complex curves and shapes. In recent years the trend toward more stylistic vehicles is increasing.

At the same time, auto manufacturers are under pressure to increase the fuel efficiency of a vehicle. Lighter materials are constantly being used. One way to lighten body panels is to provide thinner metal. Thinner metal, however, is easily deformed with enough pressure particularly when highly shaped or curved features are formed.

"Oil canning" is a term referred to when outer body panels deform in response to pressures thereon. External forces are provided pressure in various situations such as car washing, leaning on a vehicle, pushing a vehicle out of a ditch and the like. Solutions to increase the stiffness are known. Materials are typically applied to the inside panel such as foil/woven butyl, baked on mastic, heat cured materials, robotically applied epoxy and LASD materials. Built-in brace reinforcements and engineered baffles are also provided. These known solutions experience various issues. For example, heat cured patches have a different expansion rate than the outer metal panels. Also, the stiffening materials also exhibit blistering, distortion, wrinkles, air voids or fiber fusions on the face side of the substrate in response to manufacturing process conditions. Air voids and patches that delaminate from the substrate leave the surface prone to corrosion.

Liquid applied materials are also prone to delamination which allows the panels to be subject to corrosion. VOC emissions are also present in some of the stiffening materials. Efforts are always used to reduce the amount of VOC emissions in vehicle assembly.

SUMMARY

The present disclosure provides a stiffening spring for a body panel that is reliable, environmentally friendly and provide a suitable stiffening force.

In one aspect of the disclosure, a vehicle structure includes a body panel, a first spring anchor, a second spring anchor, and an elongated spring having a first end disposed at a first spring anchor and a second end disposed at a second spring anchor. The spring is preloaded when assembled to form an apex between the first end and the second end. The apex is disposed adjacent to the body panel to provide an outward force on the body panel.

In a further aspect of the disclosure, a method of assembling a vehicle structure includes coupling a first end of an elongated spring to a first spring anchor, preloading the spring to form an apex and coupling a second end of the elongated spring to a second spring anchor so that the apex provides a force on a body panel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2A is a cutaway view of a door.

FIG. 2B is a perspective view of an elongated spring.

FIG. 2C is a cross-sectional view of a spring prior to assembly relative to a door.

FIG. 2D is a cross-sectional view of a spring being assembled into a door.

FIG. 2E is a spring assembled within a door.

DETAILED DESCRIPTION

Examples will now be described more fully with reference to the accompanying drawings. The examples disclosed below are not intended to be exhaustive or to limit the disclosure to the precise forms disclosed in the following detailed description. Rather, the examples are chosen and described so that others skilled in the art may utilize their teachings.

The following description is set forth for a vehicle. Various terms such as above, below, in front, behind, inside and outside are provided with reference to the vehicle being disposed on a level surface and relative to an operator position. The term width refers to a dimension lateral to the vehicle perpendicular to the longitudinal axis and the normal direction of travel.

Figure 1:
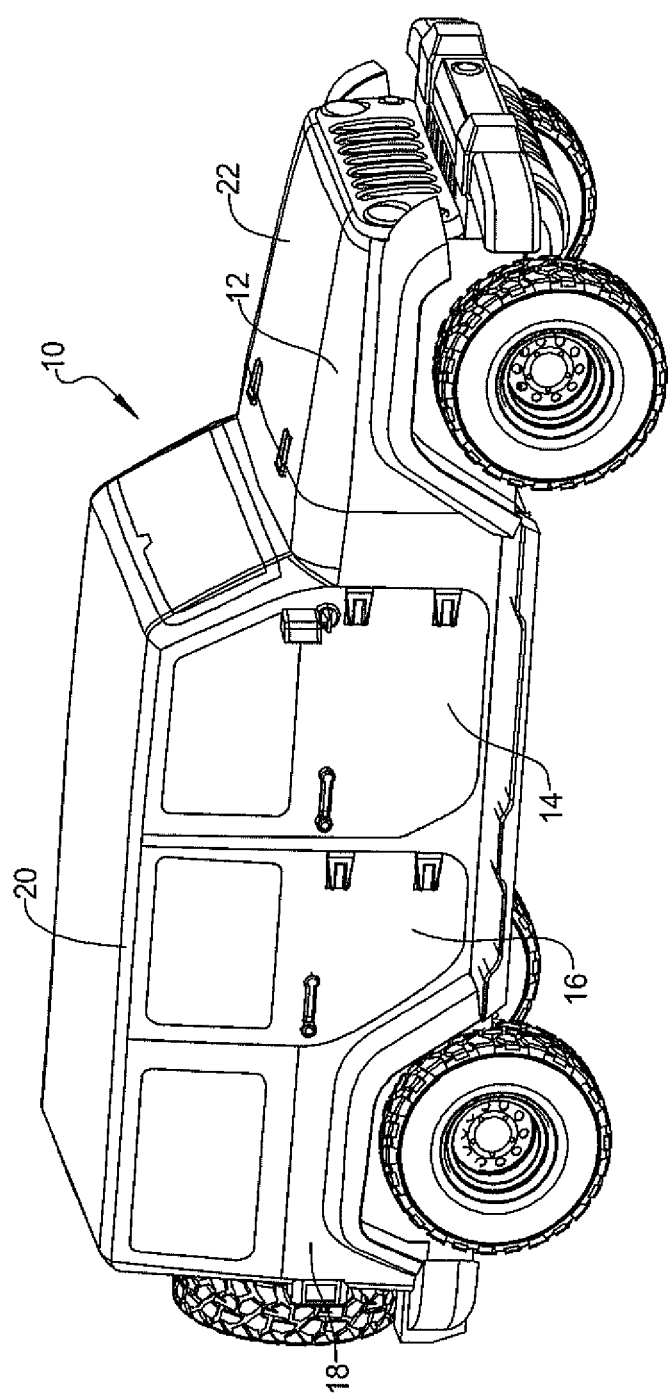
FIG. 1 is a perspective view of a vehicle having multiple panels.

Referring now to FIG. 1, a vehicle 10 is illustrated having a plurality of body panels including but not limited to a front fender 12, a front door panel 14, a rear door panel 16, a quarter panel 18 and a roof panel 20. The vehicle 10 also includes other panels such as a tailgate panel and the like. Of course, different types of vehicles such as cars and pickups have other types of panels, such as deck lids and load beds. A hood 22 is also a panel. Each of the components 12-22 benefit from the teachings set forth herein. As mentioned above, other panels benefit from the surface stiffening as is set forth herein.

Referring now to FIGS. 2A-2E, a front door 16 is illustrated for the use of a panel. In this example the door skin 30 is the panel to be stiffened. The door skin 30 is illustrated from the inside of the door 14 with any decorative trim removed. The door 16 also includes an impact beam 32 that extends across the door in a longitudinal direction. In the present example, the impact beam 32 is illustrated at an angle relative to the longitudinal axis of the vehicle.

Referring now specifically to FIG. 2B, an elongated spring 40 is illustrated. The elongated spring 40 includes a first end 40A and a second end 40B. The first end 40A has a first coupler 42A disposed thereon. The second end 40B has a second coupler 42B disposed thereon. In this example, the elongated spring 40 is metal and the couplers 42A/B are bent into a predetermined configuration. That is, the first end 40A and the second end 40B are bent into the shape of the first coupler 42A and the second coupler 42B. The shape of the couplers 42A, 42B depends upon the surfaces onto which the elongated spring 40 is to be affixed. In this example, the second end 40B, as is best illustrated in FIG. 2C, is bent with a curved portion 44 and flange portion 46. The flange portion 46 is "L-shaped". The flange 46 is used to engage a lip 48 that extends across the impact beam 32.

The first end 40A includes a flange 50. Flange 50 is formed of the elongated spring 42A or bent to facilitate assembly.

Referring now specifically to FIG. 2D, various positions during the manufacturing process of the elongated spring 40 are illustrated. In this example, the flange portion 46 is engaged into the lip 48 of the impact beam 32. The elongated spring 40 is thus preloaded and forced toward the impact beam 32 which forms a second spring anchor 58. The elongated spring 40 is bent to form an apex 52 which is placed against the door skin 30. The flange 50 is fixed into place by an interference fit or with a fastener 54 as is set forth in FIG. 2E. When installed, the elongated spring 40 is preloaded and the apex 52 provides an outward force indicated by the arrow 57. The outward force indicated by the arrow 56 counters any externally inward force indicated by an arrow 58. This allows the door skin 30 to resist "oil canning".

The elongated spring 40 is formed using various materials such as but not limited to as PET, HDPE, PVC, LDPE, PP, PS and the like. Other suitable materials for the elongated spring 40 include metals or coated metals and expandable polyurethane foams, either opened or closed. Other suitable materials for the elongated spring 40 include fiberglass or fiber reinforced sheets and laminated sheet materials.

The fastener 54 is mounted to a portion of the door of the vehicle to form a first spring anchor 56. The first spring anchor 56 is part of the door 14 or a special formation formed into the door. Slots or the like are also suitable. As mentioned above, the fastener 54 is attached. Various numbers of fasteners 54 are used in different configurations. The first end 40A is to be hooked or snapped into place.

In the present example, the elongated spring 40 is illustrated as a strip of material having a width. The material has parallel sides to form the elongated spring 40. Of course, fasteners such as nuts and screws, push pins, adhesives, rivets, clinching and hooks are being used to couple the ends of the elongated spring 40 to a spring anchor. In other examples, non-parallel sides are used.

Figure 3A:
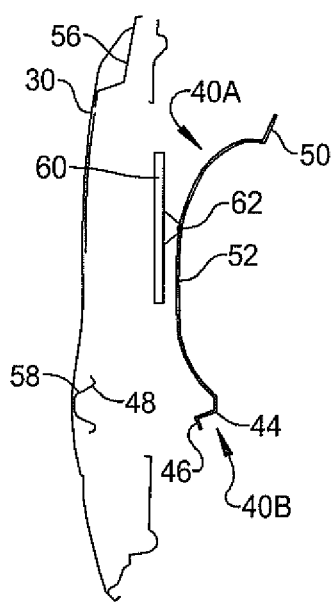
FIG. 3A is a side view of a door having a contact pad prior to assembly.
Figure 3B:
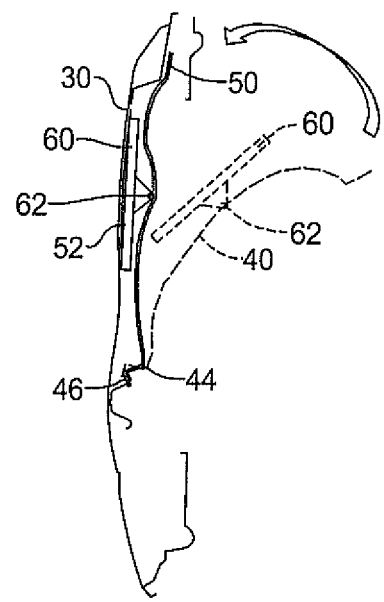
FIG. 3B is a cross-sectional view of an elongated spring having the contact pad assembled within the door.

Referring now to FIGS. 3A and 3B, an example of the spring 40 used in connection with a contact pad 60. The contact pad 60 illustrated in FIG. 3A by way of a pivot joint 62. The contact pad 60 is used to distribute the load over a wider order of the door skin 30. As is best illustrated in FIG. 3B, the contact pad 60 is illustrated pressing outwardly on the door skin 30 when the elongated spring 40 is assembled into the door. That is, the elongated spring 40 is assembled in the same manner by placing the second end 40B into the second spring anchor 58, compressing the spring 40 and contacting the first end 40A of the elongated spring 40 with the first spring anchor 56. In both cases set forth above, the installation of the elongated spring 40 does not interfere with other components within the door 14 such as the door glass 59.

Referring now in general to FIGS. 4A-4F, the contact pad 60 is formed in to various shapes and various cross-sectional profiles. Additionally, more than one contact pad and more than one elongated spring is used for a particular panel.

Figure 4A:
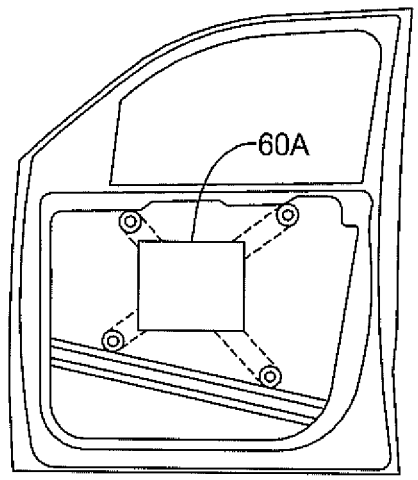
FIG. 4A is a front of a rectangular contact pad.

Referring now specifically to FIG. 4A, a rectangular contact pad 60A is illustrated. In this example, the contact pad 60A is square. However, other side proportions of rectangular pads are used in other examples. The contact pad 60A is affixed to the elongated spring.

Figure 4B:
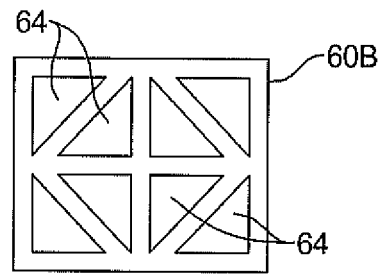
FIG. 4B is a front view of a rectangular contact pad with openings.

Referring now to FIG. 4B, contact pad 60B is similar to that illustrated in FIG. 4A except that opening 64 is cut through. The opening 64 are formed by removing cutouts from the surface of the contact pad 60B. Various numbers and sizes of openings 64 are used in other examples. The number of openings 64 depends upon the material so that a particular amount of force is applied against the particular panel.

Figure 4C:
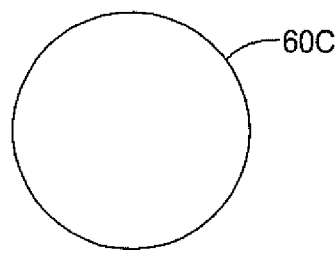
FIG. 4C is a front view of a round contact pad.

Referring specifically to FIG. 4C, a round contact pad 60C is set forth. A round contact pad 60C varies in diameter based upon the space into which the elongated spring 40 is placed. The round contact pad 60C can also be formed of various materials.

Figure 4D:
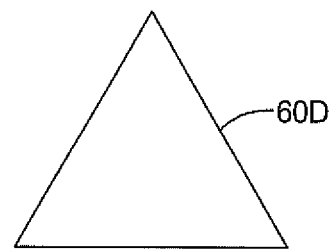
FIG. 4D is a front view of a triangular contact pad.

Referring now specifically to FIG. 4D, a triangular contact pad 60D is set forth. The triangular contact pad 60D, in this example, is an equilateral triangle. By way of example, various sizes and shapes of triangles are used.

Figure 4E:
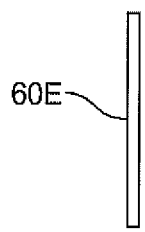
FIG. 4E is a cross-sectional view of a planar contact pad.

Referring now specifically to FIG. 4E, a contact pad is formed in various cross-sections. In this example, contact pad 60E illustrates a planar contact pad. Of course, the planar contact pad is planar in an at rest position. The contact pad 60E is flexible to allow the contact pad to conform to the shape of the panel upon which it applies a force.

Figure 4F:
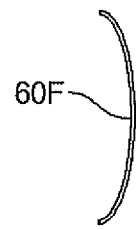
FIG. 4F is a cross-sectional view of a curved contact pad.

Referring now to FIG. 4F, a curved contact pad 60F is set forth. As mentioned above, all of the different contact pads illustrated in FIGS. 4A-4D incorporate a curved profile.

Figure 4G:
FIG. 4G is a cross-sectional view of a multi-curved contact pad.

Referring now to FIG. 4G, the contact pads 4A-4D are formed by using an irregularly shaped contact pad 60G. The irregularly shaped contact pad 60F illustrated in FIG. 4F has three curves. However, various numbers of curves are used in other examples.

Referring now to FIGS. 5A-5J, the elongated spring is formed into various shapes.

Figure 5A:
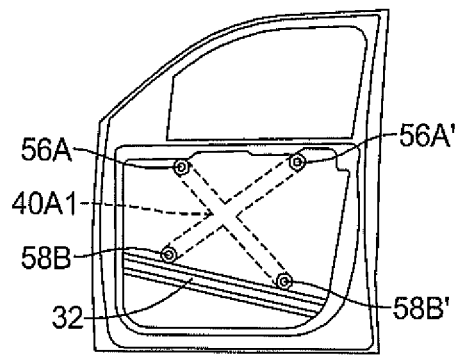
FIG. 5A is a cutaway view of a door having an X-shaped elongated spring.

Referring now specifically to FIG. 5A, an X-shaped elongated spring 40A1 is set forth. The X-shaped spring has two first spring anchors 56A and 56A' as well as two second spring anchors 58B and 58B'. The first spring anchors 56A, 56A' are located upon the door structure whereas second spring anchors 56B and 56B' are disposed on the impact beam 32.

Figure 5B:
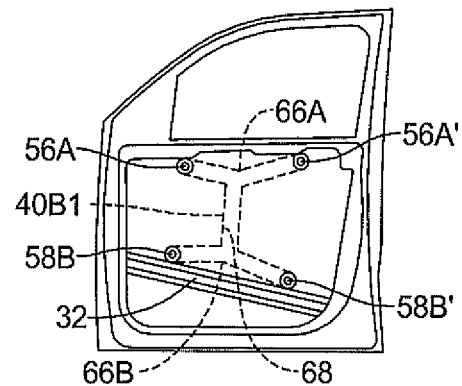
FIG. 5B is a cutaway view of a door having an H-shaped elongated spring.
Figure 5C:
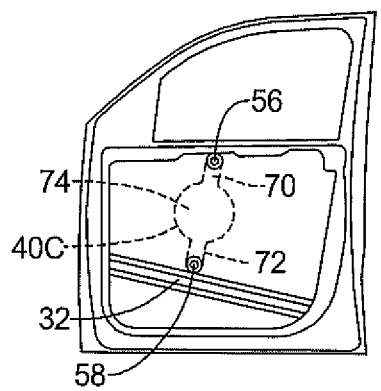
FIG. 5C is a cutaway view of a door having an O-shaped elongated spring.

Referring now specifically to FIG. 5B, an elongated spring 40BI which has an H-shape is set forth. The H-shape has two leg portions 66A and 66B which are mounted at first spring anchors 56A, 56A' and second spring anchors 58B, 58B', respectively. The leg portions 66A and 66B have a cross member 68 extending therebetween.

The elongated spring 40 is "O-shaped" in other examples. That is, a O-shaped contact pad 40C is disposed between the first spring anchor 56 and the second spring anchor 58. The "O-shaped" portion is a perfect circle or an elongated oval. A first side strap 70 and a second side strap 72 is used to mount the "O" portion 74 to the first spring anchor 56 and the second spring anchor 58, respectively.

Figure 5D:
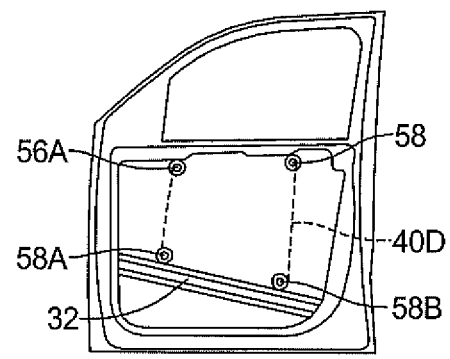
FIG. 5D is a cutaway view of a door having a sheet shaped elongated spring.

Referring now specifically to FIG. 5D, a sheet-shaped elongated spring 40D is set forth. In this example, a sheet of material is used to form the spring. In a sense, the sheet elongated spring 40D is a wide version of the elongated spring illustrated in FIGS. 2B and 3A. In this example, two first spring anchors 56A and 56B are used to mount the top edge of the sheet while second spring anchors 58A, 58B are used to mount the lower edge of the sheet. As is illustrated, the sheet has an irregular shape to conform to the cavity into which it is placed.

Figure 5E:
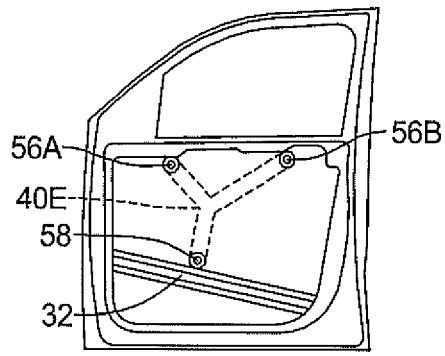
FIG. 5E is a cutaway view of a door having a Y-shaped elongated spring.

Referring now specifically to FIG. 5E, a Y-shaped elongated spring 40E is illustrated. In this example, two first spring anchors 56A, 56B are used to mount the top portion of the "Y" while a single second spring anchor 58 is used to mount the lower leg of the "Y" to the impact beam 32.

Figure 5F:
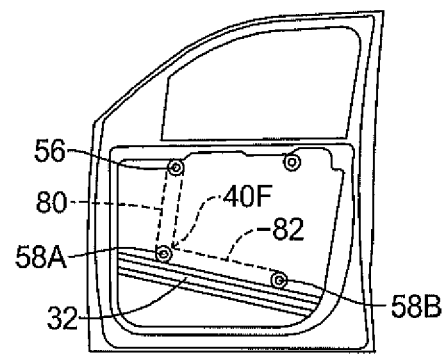
FIG. 5F is a cutaway view of a door having an L-shaped elongated spring.

Referring now specifically to FIG. 5F, an L-shaped elongated spring 40F is set forth. In this example, the upper leg of the "L" 80 is mounted with a single first spring anchor 56 while the bottom leg 82 is mounted with two second spring anchors 58A, 58B to the impact beam 32.

Figure 5G:
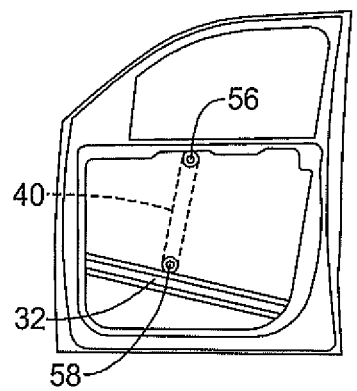
FIG. 5G is a cutaway view of a door having a rectangular shaped elongated spring.

Referring now specifically to FIG. 5G, the elongated spring 40 illustrated in FIG. 2B is set forth. In this example, a side view illustrating the first spring anchor 56 and the second spring anchor 58 are provided.

Figure 5H:
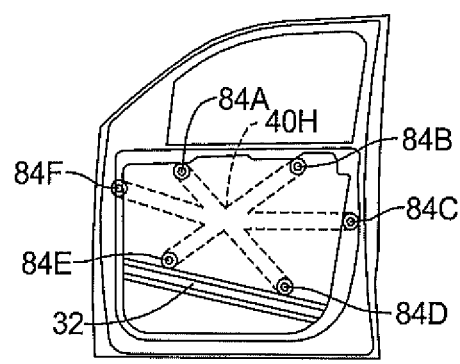
FIG. 5H is a cutaway view of a door having a star shaped elongated spring.

Referring now to FIG. 5H, a star shaped elongated spring 40H is set forth. The star shaped elongated spring 40H has six anchors 84A-84F disposed therearound. The anchors 84C and 84F are disposed on vertical members within the door 14. Anchors 84A and 84B disposed on generally horizontal portions within the door and anchor portions 84E and 84D are disposed on the impact beam 32.

Figure 5I:
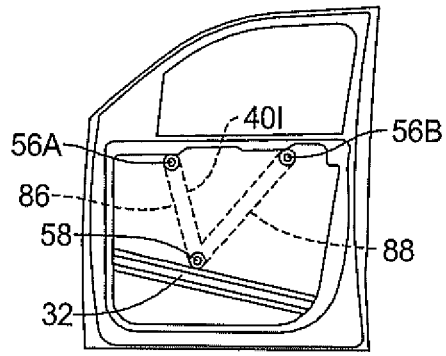
FIG. 5I is a cutaway view of a door having a V-shaped elongated spring.

Referring now to FIG. 5I, a V-shaped elongated spring 40I is set forth. In this example, a first leg 86 and a second leg 88 meet at the second spring anchor 58. However, the upper leg 86 is coupled to the first spring anchor 56A and a second first spring anchor 56B is coupled to the second leg 88. The first spring anchors 56A, 56B are disposed upon a generally horizontal portion of the door whereas the second spring anchor 58 is disposed on the impact beam 32.

Figure 5J:
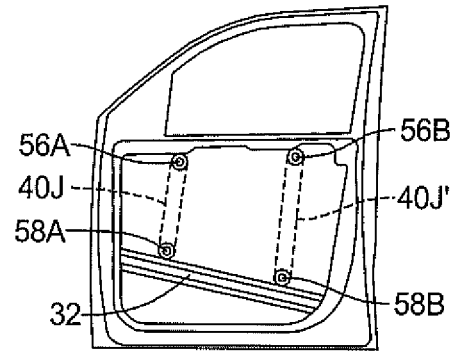
FIG. 5J is a cutaway view of a door having a parallel rectangular shaped elongated spring.

Referring now to FIG. 5J, two elongated springs 40J and 40J' are illustrated extending between the first spring anchors 56A and second spring anchor 58B, respectively. Although the elongated springs 40J, 40J' are generally parallel, there is no requirement that they be parallel. That is, the elongated springs 40J and 40J' are askew.

Figure 6A:
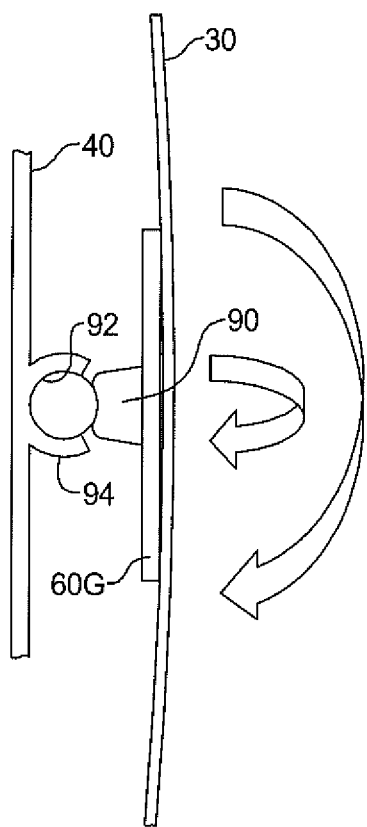
FIG. 6A is a side view of a ball mounted contact pad.

Referring now to FIG. 6A, as mentioned above the elongated spring 40 pivots or moves relative to a contact pad 60G. In this example, the contact pad 60G has an extension 90 that extends laterally from the contact pad 60G and contains a ball 92. The ball 92 is received within a receiver or socket 94 that is formed or coupled to the elongated spring 40. In this manner, the contact pad 60G rotates relative to the elongated spring 40 to facilitate assembly and contact with the door skin or other panel. The direction of rotation of the contact pad 60G relative to the elongated spring 40 is therefore infinite.

Figure 6B:
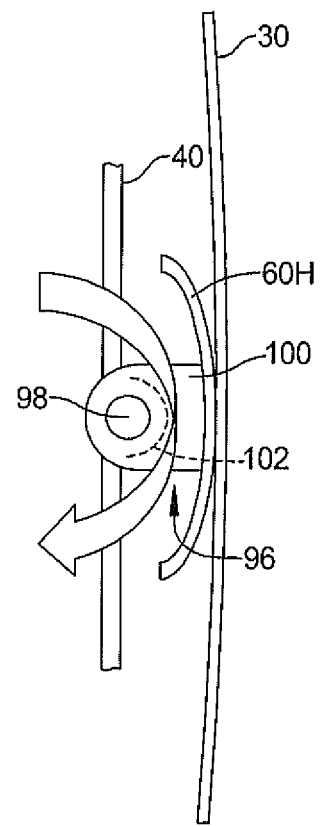
FIG. 6B is a side view of a hinge mounted contact pad.

Referring now to FIG. 6B, contact pad 60H is coupled to the elongated spring 40 with a hinge 96 having a hinge pin 98. The hinge pin 98 is coupled through an extension 100 of the contact pad 60H. In this example, the cross-section of the contact pad 60H is arc-shaped. A pin receiver 102 is formed on the elongated spring 40 receives the hinge pin 98. In this example, the contact pad rotates about the hinge pin 102.

Figure 6C:
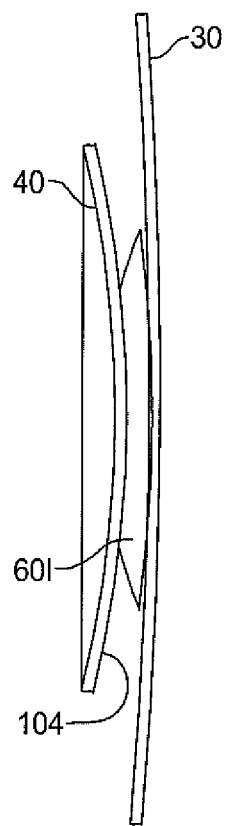
FIG. 6C is a side view of a resistance contact pad.

Referring now to FIG. 6C, the contact pad 60I includes a resistance surface 104. The resistance surface 104 contacts the door skin 30. The elongated spring 40 has the contact pad 60I mounted thereon. The contact pad 60I is adhesively mounted or the like.

Each of the contact pads 60G, 60H and 60I illustrated in FIGS. 6A-6C has padding, adhesive, anti-fluttering, or damping material.

Figure 7:
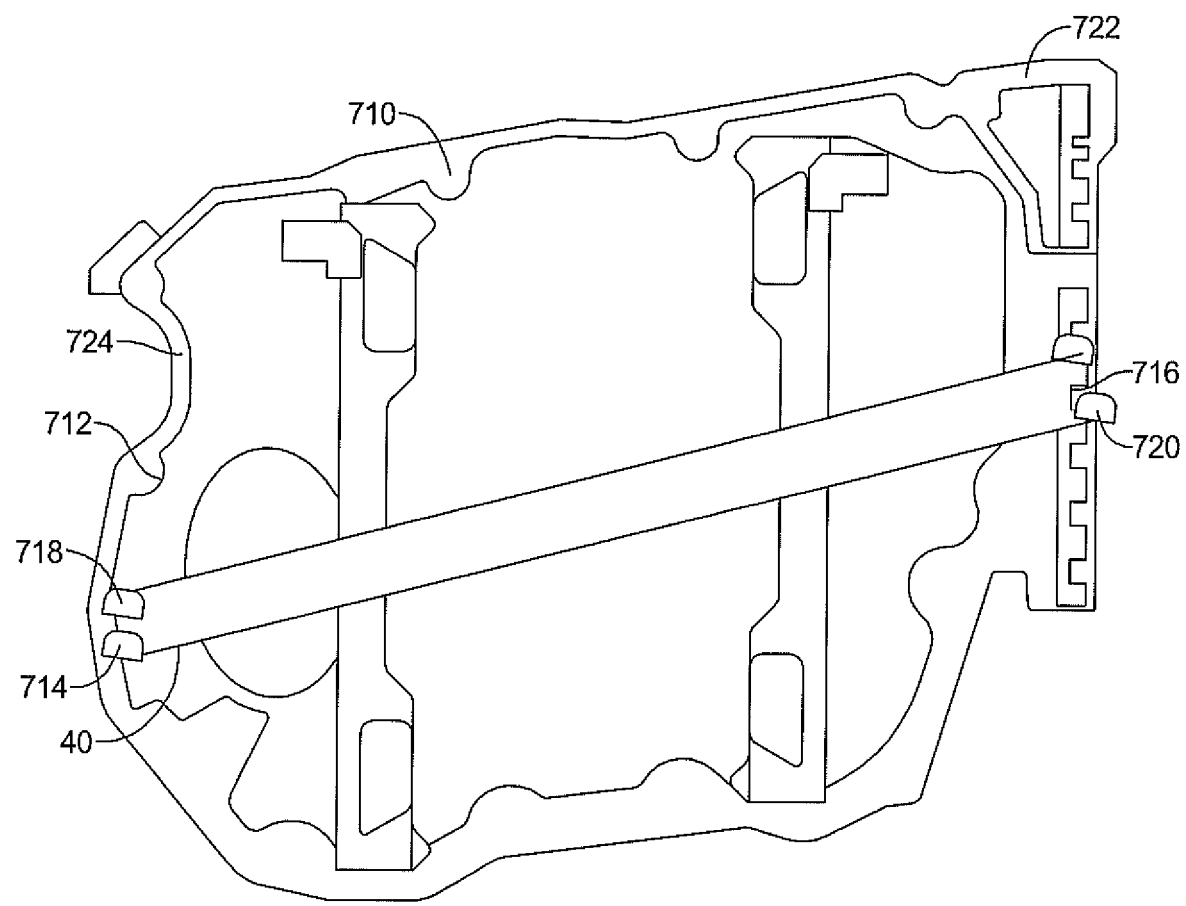
FIG. 7 is a cutaway of an inner door module.

Referring now to FIG. 7, the elongated spring 40 is be coupled within an inner door module 710. In this example, the inner door module 710 provides the finished trim surfaces that face the driver on the panel 712. An outer door skin module 730 (illustrated below) meets with the inner module 710 in the finished product. The door module 710 includes an elongated spring 40 coupled to a spring receiver 714 and a second spring receiver 716. The spring receivers 714 and 716 are part of the inner door module 710. When the inner door module 710 is inserted within the outer door module 730, the elongated spring 40 is preloaded and thus provides an outward force on the door skin. First spring receiver 714 receives a first end 718 of the spring 740 while a second end 720 is coupled to the second spring receiver 716. The second spring receiver 720 is coupled to a vertical member 722 while the first spring receiver 714 is coupled to a panel 724.

Figure 8:
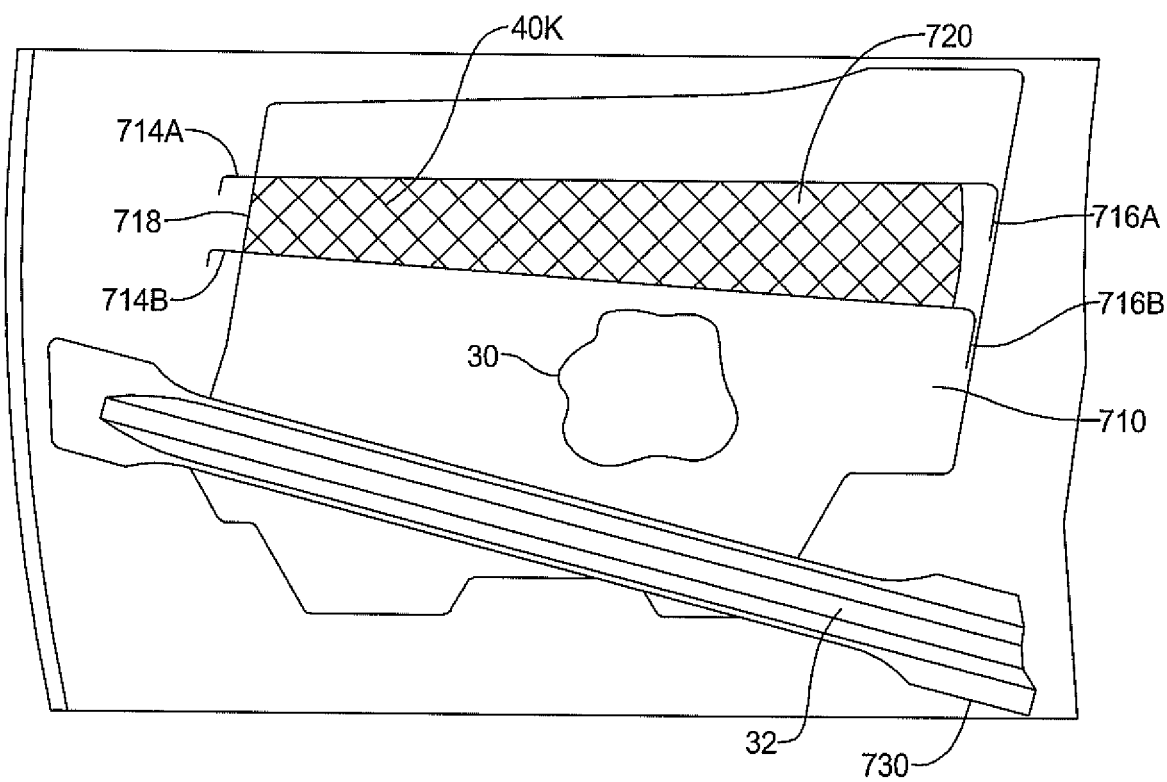
FIG. 8 is a cutaway of an inner door module assembled with an outer door module with a mesh elongated spring.

Referring now to FIG. 8, the inner door module 710 is illustrated coupled to the outer door module 730. In this example the impact beam 32 is part of the outer door module 730. The first spring receiver 714 receives a first end 718 of the spring and the second spring receiver 716 receives the second end 720 of the spring 40K. In this example, the spring 40K has a two-part first end 718 and a two part second end 720 that are received within a two part spring receiver 714A,714B and a respective second spring receiver 716A and 716B. In this example, the spring 40K is formed of a mesh material. The mesh material is preloaded as in the other springs described above. Upon assembly of the inner door module 710 within the outer door module 730, the door skin 30, which is only partially shown, is pushed outward or perpendicular to the direction of the page. A similar example relative to the inner door module 710 and the outer door module 730 is set forth. In this example the common components are labeled the same. The first spring receiver 714A, 714B are located in different positions on the inner door module 710. The first spring receiver 714A is located on a vertical surface edge while the first spring receiver 714B is located on a horizontal surface. The spring receivers 716A and 716B are both mounted on the same vertical surface on the inner door module 710.

In this example, the elongated spring 40L is twisted. A twist 732 is used to house or mount a contact pad 734 thereto. In the same manner, the elongated spring 40L provides an outward force on the door skin 30, which is partially illustrated. Any one of the types of contact pads 734 are capable of being implemented therein.

Figure 9:
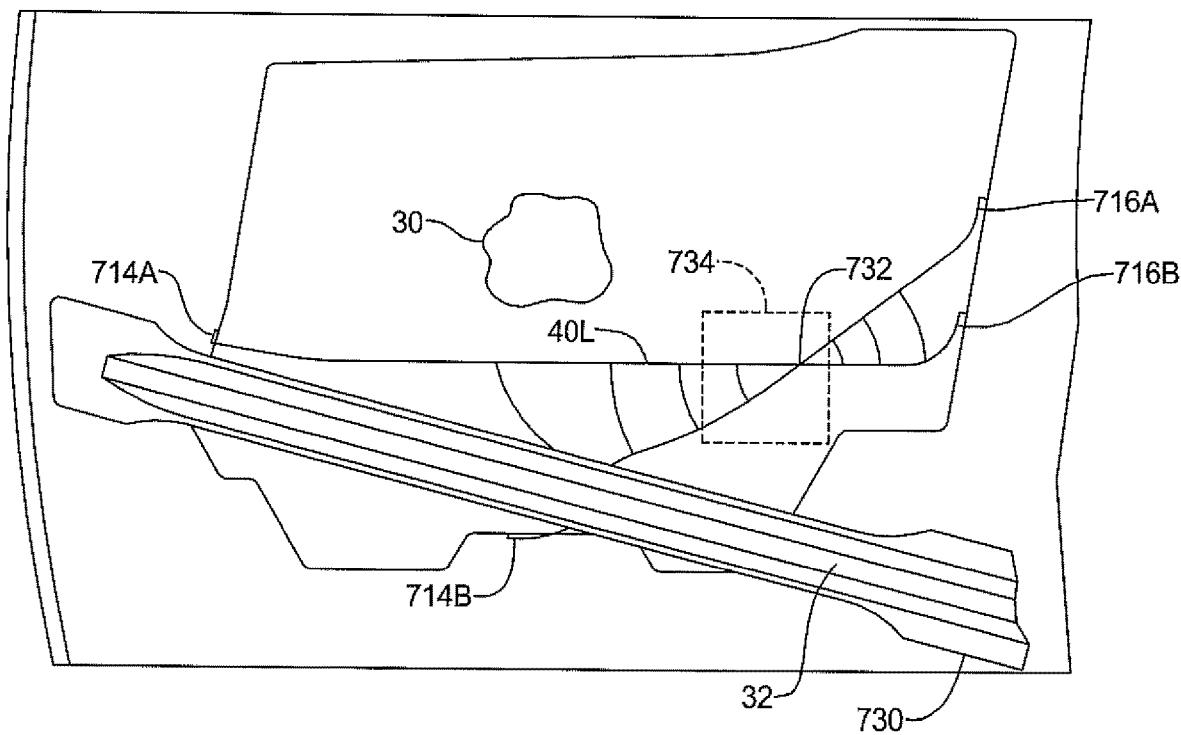
FIG. 9 is a cutaway view of an inner and outer door panel assembled with a twisted elongated spring.
Figure 10:
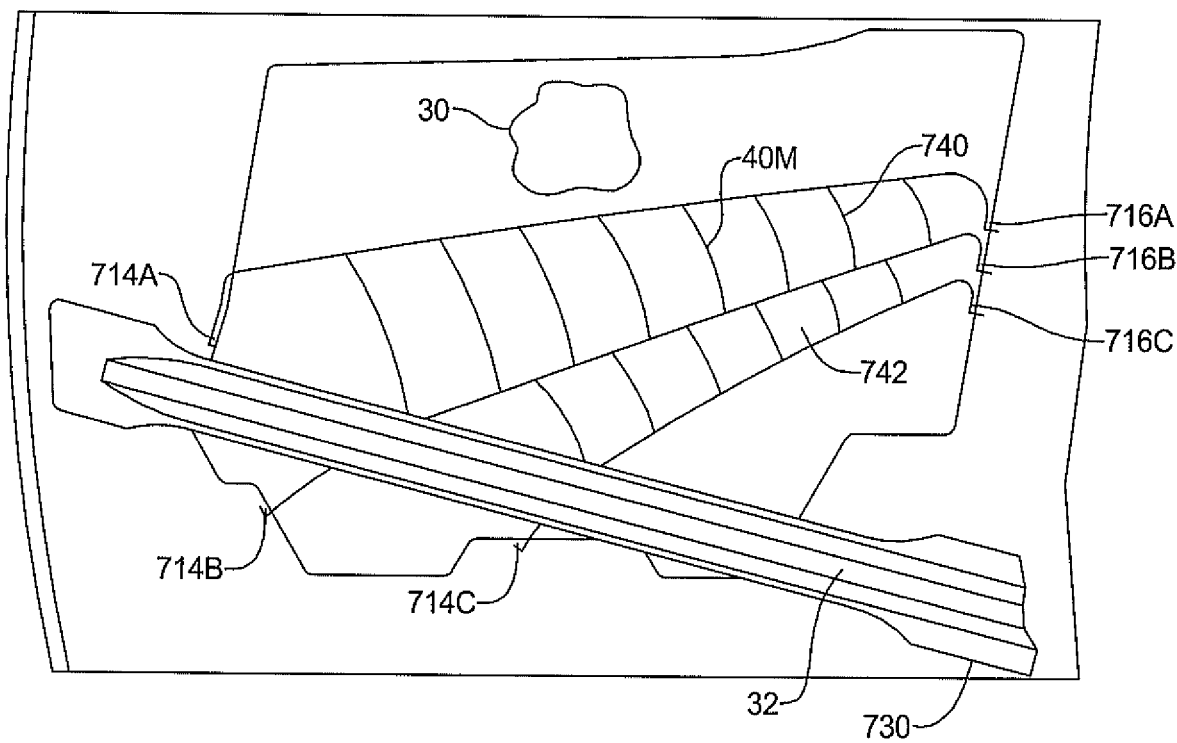
FIG. 10 is a cutaway view of an assembled inner and outer door module with a two portion elongated spring.

Referring now to FIG. 10, the door module 710 and 730 similar to that illustrated in FIG. 9 is set forth. However, in this example, three first spring receivers 714A, 714B and 714C along with three second spring receivers 716A, 716B and 716C. In this example, the elongated spring 40M comprises a first portion 740 and a second portion 742. Each portion has different characteristics and extend a different amount toward the door skin. Such a configuration is suitable for a door having multiple contours. Thus, one spring assembly process is used to install the multi-portion spring 40M.

The above examples illustrate that the elongated spring is attached to both sides of an inner door panel, or to structural beams between various structural members within a door panel or other structure of the vehicle.

Figure 11A:
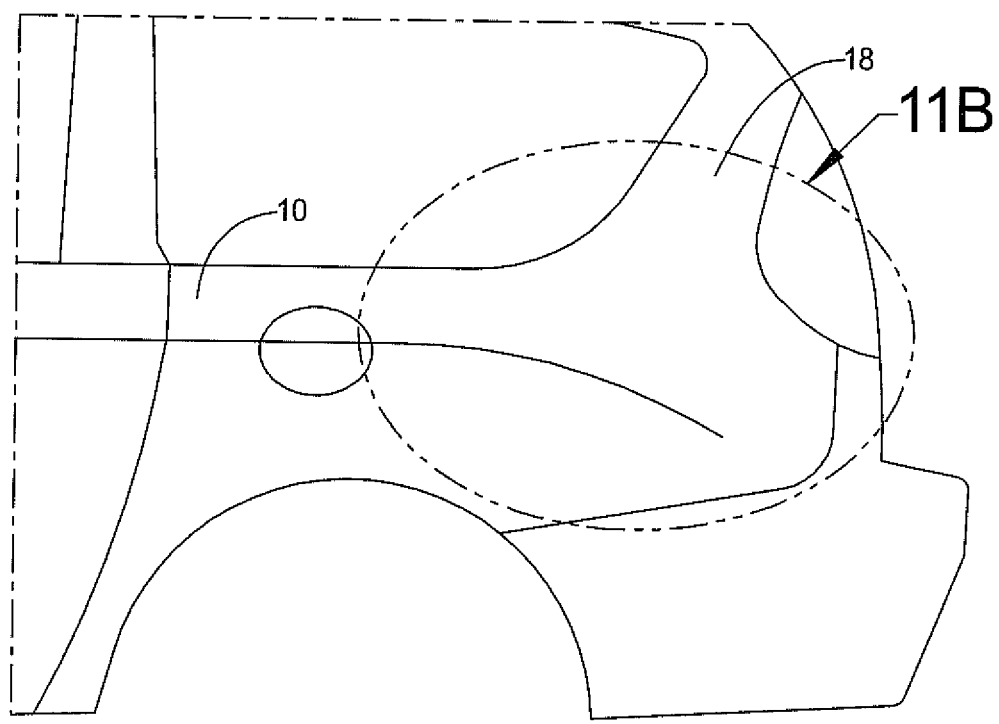
FIG. 11A is an enlarged view of a quarter panel of a vehicle.
Figure 11B:
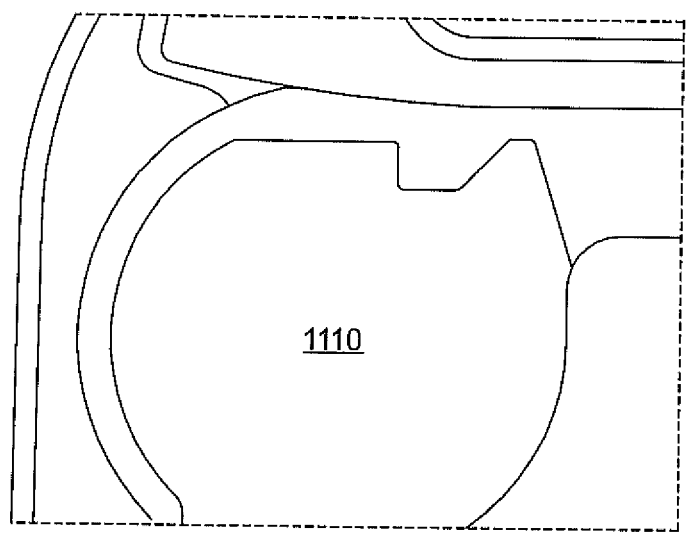
FIG. 11B is an inside view of a quarter panel of 11A.
Figure 11C:
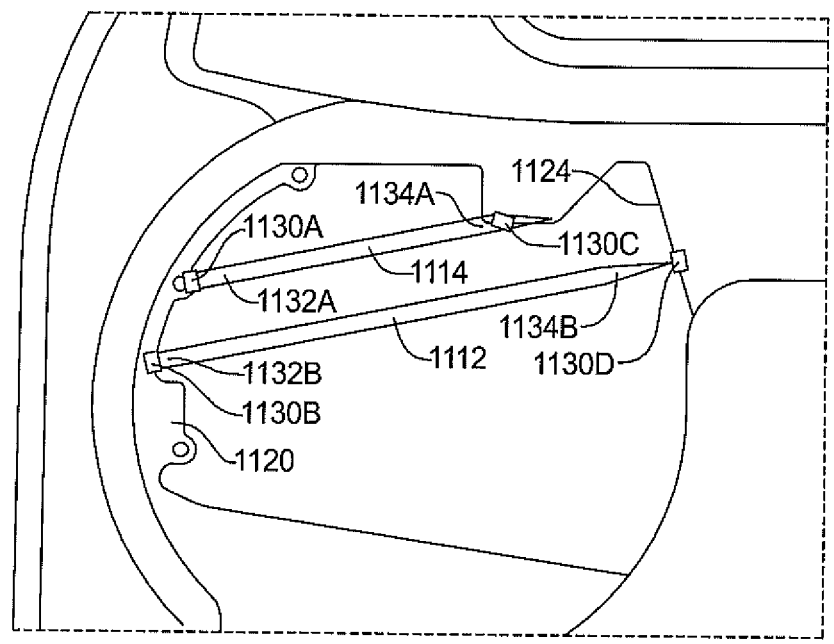
FIG. 11C is an enlarged interior view of the quarter panel having two elongated springs disposed therein.

Referring now to FIGS. 11A-11C, a quarter panel 18 is illustrated in further detail. The circled portion of FIG. 11A is illustrated in FIG. 11B from the inside of the vehicle. As is illustrated, structural members are provided therein. A cavity 1110 is formed on the inside of the quarter panel. Before the final trim pieces are assembled, a first elongated spring 1112 and a second elongated spring 1114 are illustrated coupled to structural members 1120, 1124. Spring anchors 1130A, 1130B, 1130C and 1130D are intricately formed or mounted on the structural members 1120, 1124. First ends 1132A and 1132B of the elongated springs 1112 and 1114 are coupled to the spring anchors 1130A and 1130B. A stiffening force is provided outward toward the outer surface to reinforce the quarter panel 18. Various regions and panels of the vehicle, as mentioned above, implement the elongated spring 40 to provide stiffening of various panels.

Those skilled in the art will now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A vehicle structure comprising
a body panel;
a first spring anchor;
a second spring anchor; and
an elongated spring comprising a first end disposed at a first spring anchor and a second end disposed at a second spring anchor, said elongated spring preloaded when assembled to form an apex between the first end and the second end, said apex disposed adjacent to the body panel to provide an outward force on the body panel.

2. The vehicle structure of claim 1 wherein the first end is coupled to the first spring anchor and wherein the second end is clipped to the second spring anchor.

3. The vehicle structure of claim 1 wherein the first end is coupled to the first spring anchor and wherein the second end is fixedly fastened to the second spring anchor with a fastener.

4. The vehicle structure of claim 1 wherein the elongated spring extends generally horizontally across the body panel.

5. The vehicle structure of claim 1 wherein the elongated spring extends generally vertically across the body panel.

6. The vehicle structure of claim 1 further comprising a contact pad disposed at about the apex.

7. The vehicle structure of claim 6 wherein the rotatable contact pad is coupled to the elongated spring with a hinge.

8. The vehicle structure of claim 6 wherein the rotatable contact pad is coupled to the elongated spring with a ball and socket.

9. The vehicle structure of claim 6 wherein the contact pad comprises a planar cross section.

10. The vehicle structure of claim 6 wherein the contact pad comprises a curved cross section.

11. The vehicle structure of claim 1 wherein the body panel comprises a door panel.

12. The vehicle structure of claim 1 wherein the body panel comprises a quarter panel.

13. The vehicle structure of claim 1 wherein the body panel comprises a fender.

14. The vehicle structure of claim 1 wherein the first spring anchor comprises an intrusion beam.

15. The vehicle structure of claim 1 wherein the body panel is disposed in a first module and the first spring anchor, the second spring anchor and the elongated spring are disposed within a second module, so that when the first module is coupled to the second module the apex is adjacent to the body panel.

16. The vehicle structure of claim 1 wherein the elongated spring comprises a mesh having a first portion and a second portion.

17. A method of assembling a vehicle structure comprising:
coupling a first end of an elongated spring to a first spring anchor;
preloading the elongated spring to form an apex; and
coupling a second end of the elongated spring to a second spring anchor so that the apex provides a force on a body panel.

18. The method of claim 17 wherein the force is an outward force.

19. The method of claim 17 wherein the elongated spring is disposed on a first spring anchor and, the second spring anchor disposed on a body panel.

20. The method of claim 17 wherein the apex provides the force on the body panel through a contact pad.

* * * * *